(12) United States Patent
Rao et al.

(10) Patent No.: US 6,882,859 B1
(45) Date of Patent: Apr. 19, 2005

(54) SECURE AND CUSTOM CONFIGURABLE KEY, PEN OR VOICE BASED INPUT/OUTPUT SCHEME FOR MOBILE DEVICES USING A LOCAL OR CENTRAL SERVER

(76) Inventors: Sunil K. Rao, 3087 Alexis Dr., Palo Alto, CA (US) 94304; Sanjay K. Rao, 3087 Alexis Dr., Palo Alto, CA (US) 94304; Raman K. Rao, 3087 Alexis Dr., Palo Alto, CA (US) 94304

( * ) Notice: Subject to any disclaimer, the term of this patent is extended or adjusted under 35 U.S.C. 154(b) by 543 days.

(21) Appl. No.: 09/597,607

(22) Filed: Jun. 20, 2000

Related U.S. Application Data

(63) Continuation-in-part of application No. 09/281,739, filed on Jun. 4, 1999, now Pat. No. 6,169,789, which is a continuation-in-part of application No. 08/764,903, filed on Dec. 16, 1996, now abandoned.

(51) Int. Cl.[7] .................................................. H04B 1/38
(52) U.S. Cl. ........................... 455/550.1; 455/575.1; 455/557; 455/556.1; 345/168; 345/173
(58) Field of Search .......................... 455/550.1, 575.1, 455/186.1, 422.1, 556.1, 85, 154, 160, 90, 344, 557, 550, 575, 422, 556, 346, 3.06; 395/146; 341/23, 22; 340/539, 506; 345/186, 179, 115, 173, 168; 709/22; 200/339, 5 A; 273/237; 400/90; 379/93, 16, 17, 25, 101.02, 100.12; 382/187, 188; 364/900, 709, 200

(56) References Cited

U.S. PATENT DOCUMENTS

| | | | |
|---|---|---|---|
| 4,675,653 A | | 6/1987 | Priestley |
| 4,696,054 A | * | 9/1987 | Tsugei et al. .................. 455/89 |
| 4,772,876 A | * | 9/1988 | Laud ........................... 340/539 |
| 4,844,637 A | * | 7/1989 | Buisson et al. ................ 341/23 |
| 4,853,888 A | * | 8/1989 | Lata et al. .................... 345/172 |
| 5,164,723 A | * | 11/1992 | Nebenzahl ..................... 341/23 |
| 5,195,130 A | | 3/1993 | Weiss et al. |
| 5,276,794 A | * | 1/1994 | Lamb, Jr. .................... 395/149 |
| 5,379,341 A | | 1/1995 | Wan |
| 5,410,738 A | | 4/1995 | Diepstraten et al. |
| 5,465,401 A | | 11/1995 | Thompson |
| 5,502,460 A | * | 3/1996 | Bowen ........................ 345/168 |
| 5,513,242 A | | 4/1996 | Mukerjee et al. |
| 5,517,553 A | | 5/1996 | Sato |
| 5,539,391 A | | 7/1996 | Yuen |
| 5,555,258 A | | 9/1996 | Snelling et al. |
| 5,559,794 A | | 9/1996 | Willis et al. |
| D374,675 S | | 10/1996 | Sakai et al. |
| 5,565,929 A | | 10/1996 | Tanaka |
| 5,566,205 A | | 10/1996 | Delfine |
| 5,577,118 A | | 11/1996 | Sasaki et al. |
| 5,594,953 A | * | 1/1997 | Ross et al. ..................... 455/89 |
| 5,760,773 A | * | 6/1998 | Berman et al. .............. 345/347 |
| 6,058,304 A | * | 5/2000 | Callaghan et al. ........... 455/422 |
| 6,121,960 A | * | 9/2000 | Carroll et al. ............... 345/173 |
| 6,209,034 B1 | * | 3/2001 | Gladwin et al. ............. 709/227 |
| 6,268,806 B1 | * | 7/2001 | Frager et al. .................. 341/22 |

FOREIGN PATENT DOCUMENTS

WO    WO92/03884 B1    3/1992

* cited by examiner

Primary Examiner—Edward F. Urban
Assistant Examiner—Charles Chow

(57) ABSTRACT

A keyboard apparatus for information entry with means for dynamically configuring a legend on a key of the keyboard apparatus. The keyboard apparatus includes means for detecting a selection of the key, and means for associating the selection of the key with the legend on the key. The legend is displayed on a LCD device forming a part of the key or is displayed on a LCD device forming a keyboard. Alternatively, the key may be selected by suing a touch sensitive LCD display.

26 Claims, 3 Drawing Sheets

SECURE AND CUSTOM CONFIGURABLE KEY, PEN OR VOICE BASED INPUT/OUTPUT SCHEME FOR MOBILE DEVICES USING A LOCAL OR CENTRAL SERVER

CROSS REFERENCE TO RELATED APPLICATIONS

The present application is a continuation-in-part of application entitled INTELLIGENT KEYBOARD SYSTEM, Ser. No. 09/281,739, filed Jun. 4, 1999 now U.S. Pat. No. 6,169,789, which is a continuation-in-part application of now abandoned application entitled A SYSTEM LEVEL SCHEME TO CONTROL INTELLIGENT APPLIANCES, Ser. No. 08/764,903 filed Dec. 16, 1996 now abandoned.

BACKGROUND OF THE INVENTION

Currently the key pad buttons on a cellular telephone/mobile device (CT/MD) pose a limitation in inputting broad based queries. There are only 12 non-control buttons on many CT/MDs. Even where there are more, there are so few that inputting even as little as the letter-number ASCII set is not really practical. For example, in the present art there have been attempts to expand the number of keys, such as treating the numeric keys as numbers unless a code is entered, such as "*#" or the like, then treating a "2" as an "a", "2—2" as a "b", and "2—2—2" as a "c". Entering "2" three times to form a "c" is both confusing and slow, and such approaches have not been popular. If a mixed string of letters and numbers are desired, there three "2"s may have to be delimited with, for example, "*#", and the process becomes increasingly more unwieldy. There has been some success in using a computer, especially a computer operating with "fuzzy" logic, to extract the probable combination of letters in a numeric string, exemplified by an interactive directory for finding the telephone extension number of an employee by "spelling" the employee's name on a numeric key pad. This is a satisfactory solution only in limited cases. Numeric reduction of this type has not been generally used except for telephone directories and similar purposes.

SUMMARY OF THE INVENTION

It is an object of the present invention to provide a scheme by which the limitations of a key pad are overcome and the key pad is enhanced. The scheme uses a local or network server.

The protocols for configuring each key to a specific function or variable set of functions are stored in a Server C. The protocols for all keys may be stored on Server C similarly. The menu for any macro function can be stored on this Server C. Server C may be part of a local loop or located on the internet.

In an embodiment of the present invention, displays, such as small LCD displays, are mounted on the top of the keys and connected to a matrix addressing system. When a key is reconfigured, such as from an English language "A" to some Japanese character, the legend displayed on the key with the small display is changed accordingly.

In another embodiment of the present invention, the keyboard is displayed in the display window of a computing device, such as a hand held wireless device. The term wireless device includes entertainment/game machines. The screen of the wireless device is touch sensitive, so the user can type on the screen as if it were a standard keyboard.

In another embodiment of the present invention, the keyboard is displayed on a separate screen in the position of and replacing the keyboard on a device, such as a hand held wireless device. This screen is touch sensitive, so the user may type on it as if it were a keyboard.

In another embodiment of the present invention, the keys on any of the above keyboards, as well as on keyboards of the present invention generally, have a sound output, such as a voice output. In this way visually impaired or persons with similar concerns can listen to what keys are being depressed.

Other objects, features and advantages of the present invention will become apparent from the following detailed description when taken in conjunction with the accompanying drawings.

BRIEF DESCRIPTION OF THE SEVERAL VIEWS OF THE DRAWING

The accompanying drawings, being incorporated in and forming a part of this specification, illustrate embodiments of the invention and, together with the description, serve to explain the principles of the present invention.

DETAILED DESCRIPTION OF THE INVENTION

Figure 1:
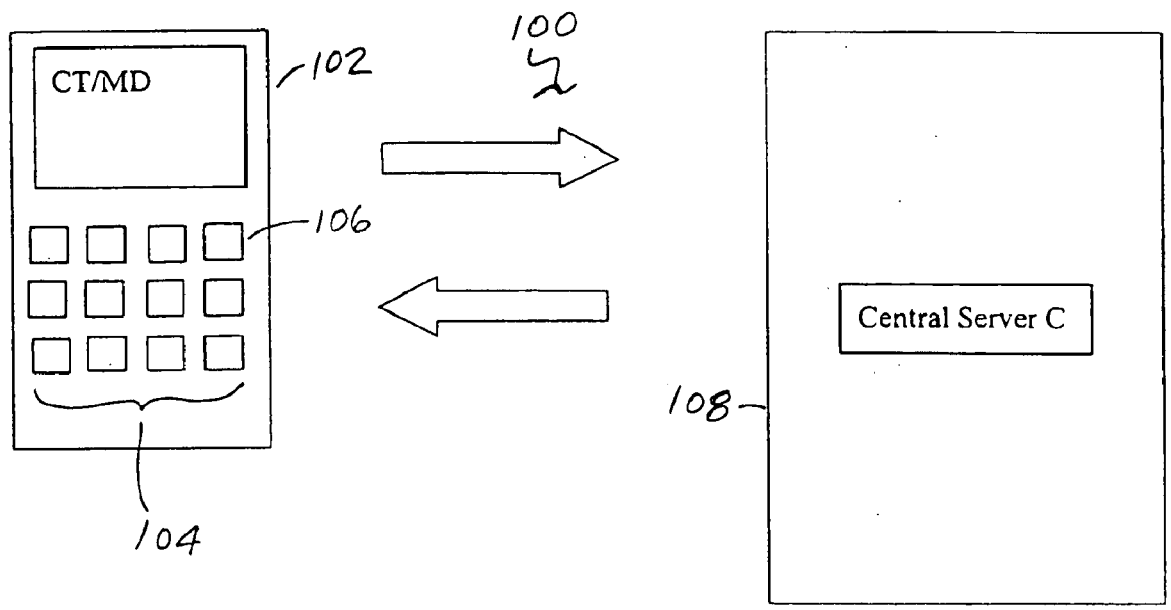
FIG. 1 is an embodiment of the present invention showing a CT/MD with a reconfigurable keyboard communicating with a Central Server C.

The present invention provides means for more easily and intuitively assigning, for example, key values to a wireless device such as to a key associated with the wireless device. The present invention also provides means for compressing or expanding the keys on an entry system such as a wireless device or wireless computing device to more efficiently provide keys needed for entry or other reasons, such as sound, in a desired space.

The present invention uses a Central Server C providing the software routines and other support for realizing the improved input key means for a wireless device or for a wireless computing device.

Thus the Server C contains a number of menus for different applications comprising of assigned values for each key function.

1. Individual Key–>may take one or more values that are programmable.

2. Full set or subset of keys–>may take one or more values that are programmable.

3. The individual or subsets or full set of keys –>is programmable to perform assigned functions.

4. The above individual or subset or full set of keys in combination may comprise a menu to perform various customizable functions.

5. The identity of each programmed value for a key, set of keys or full set of keys is stored in the Server C.

6. The menus, sub menus and individual key functions are stored in Server C and may be accessed for use by wired or wireless means. They can be dynamically changed as defined by the user's needs.

7. The user may easily go from one set of functions or menus to another set of functions or menus by selecting an option from the CT/MD.

8. The menus or functions may coexist on the CT/MD. One function or menu may go to the background and one may be in the foreground. One set may be primary and the others secondary or a hierarchy of functions/menus may be maintained, such as with a windowing of templates, where the user may change templates in the same manner as changing windows on a personal computer (PC).

9. Server C manages the delivery of these functions to the CT/MD and also maintains a history.

10. This same process is extendible to pen based inputs where certain figures or icons or strokes may be designated to indicate certain functions or menus that we stored on the Server C and delivered as needed by a command from the CT/MD.

11. This same process is extendible to voice based input commands and output where each voice command or output means a certain function or a menu that is stored in Server C. The voice recognition function in addition may add more functionality to respond to a given voice. The voices may be in different languages.

12. The same process may be extendible to sounds rather than voice; for example, the sound of a bell.

In addition the CT/MD may contain electronics and process capability to internally store the various programmable key functions or menus such that different functions and menus may be chosen as the need arises.

In addition, the web server may be shrunk into a microchip that can be part of the internal electronics of the CM/MD, in which case a local or network server may or may not be needed. In this event the features described above for programming and describing each key or input/output could be handled by the internal web server independently or in conjunction with a local or network Server C.

If a user initiates communication with a particular device, i.e., if a user selects a particular device, the system may understand the context and may change the keypad automatically. Thus the system may perform context-aware keypad changes. This context may be based upon location, the device communicated with, devices present in its local environment, or other factors FIG. 1 illustrates a wireless system 100 with a CT/MD 102 having a dynamically reconfigurable keypad 104. Such a keypad 104 provides the ability to define macro keys not included with the standard alphanumeric keypad. In FIG. 1, a CT/MD 102 which seems standard has display devices mounted on each key 106, so that the legend appearing on the key 106 is configurable in software such as from Central Server C 108 without requiring external physical changes.

Figure 2:
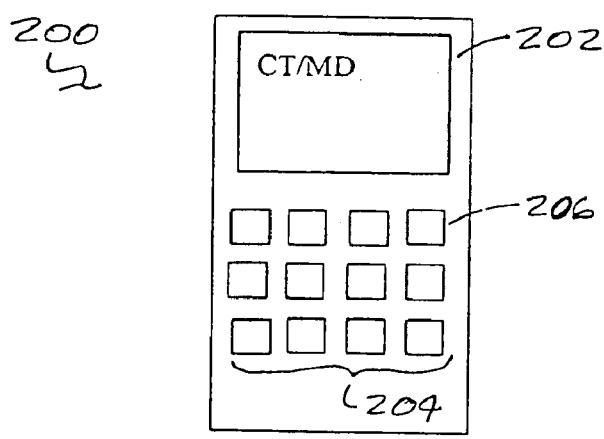
FIG. 2 is an embodiment of the present invention showing a CT/MD with display devices on the keys for defining the function of the key dynamically.

FIG. 2 illustrates a wireless device 200 such as a CT/MD having a display 202 and a key pad 204. The key pad 204 has keys such as key 206 which are assignable as desired in software.

The user may choose to reassign a key on the wireless device to represent a particular function. For example, the user could assign a key to server as a garage door opener.

The user may also use this functionality for universal language capability, such as to change an English keypad to serve as a Japanese keypad. The display mounted on the key may be used to change the keypad template, such as by introducing a Japanese character on the key replacing the English letter "A" or a macro such as "open garage door".

Figure 3:
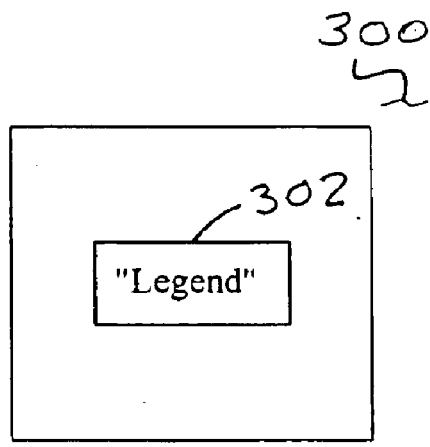
FIG. 3 is an embodiment of the present invention showing a key with a screen or display thereon for containing a legend.

FIG. 3 shows an embodiment of the present invention in the form of a key 300 such as a key that might be found on a multifunction keyboard. In FIG. 3, the key 300, such as a key from a multi-function keypad, is composed of a liquid crystal display (LCD) which can be modified with electrical inputs only. In this manner, as new templates are used, the key 300 will immediately reflect these changes. Thus, when a key 300 is reassigned a new name and function, the key's new name can become apparent to the user as a legend 302 on the key 300 itself.

The LCD or similar display need not form a part of the key. A clear button made of, for example, plastic may encase a LCD type display which may or may not be touch sensitive; that is, a touch sensitive LCD. As new templates are loaded, the LCD display is modified to reflect these changes.

Figure 4:
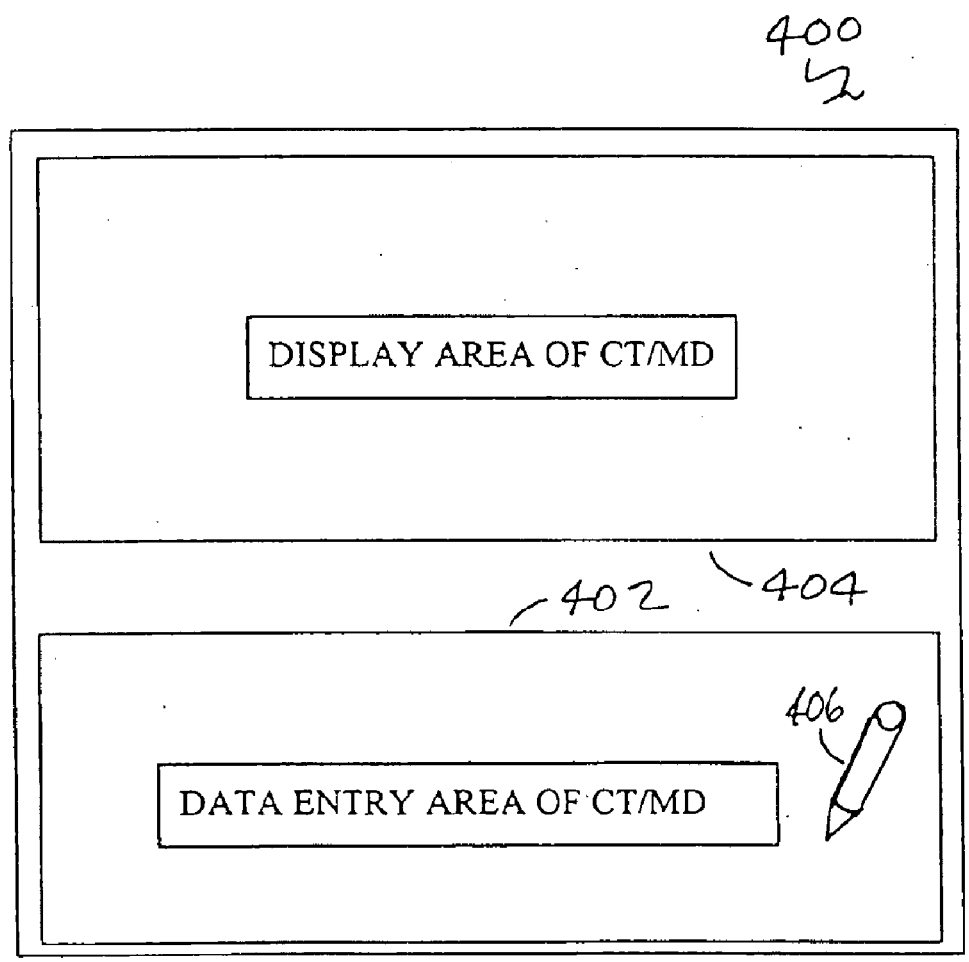
FIG. 4 is an embodiment of the present invention showing a wireless device having a screen for containing a keypad which is accessed by a pointer, such as a stylus.

FIG. 4 shows an embodiment of the present invention with a CT/MD 400. FIG. 4 shows the CT/MD 400 having a dynamic key pad 402 such as a touch sensitive LCD panel. The CT/MD 400 optionally includes a liquid crystal display (LCD) 404. If a writing area is present then new templates can be loaded with, for example, selectable icons, and a stylus 406 can be used to choose the various keys.

Server Bases, Remote Handwriting Recognition.

Handwriting recognition may be processing intensive. Wireless devices may not have the processing capability to perform advanced handwriting recognition techniques within a reasonable time. The wireless devices can offload handwriting recognition functions to a central server. The server may then transmit the recognized characters back to the wireless device, such as a screen 402.

This could serve also as a signature authentication or finger print authentication mechanism. A scanner could be used to perform finger print authentication. Such authentication could take place remotely on a Central Server C 108.

Figure 5:
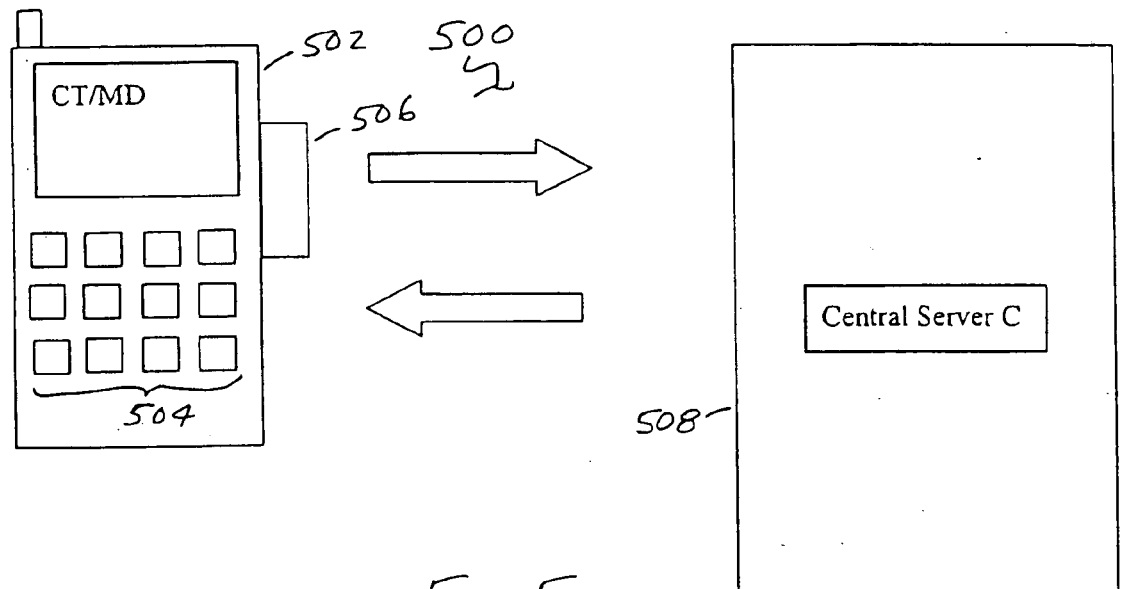
FIG. 5 is an embodiment of the present invention showing a wireless device having a microphone for allowing voice entries for language translation.

FIG. 5 illustrates a wireless system 500 which is an embodiment of the present invention. In FIG. 5, a wireless device 502 transmits an image of the text that has been captured from the writing area 504. This may be a bit map image or it could be in a standard format that both the wireless device 502 and Central Server C 508 understand.

The wireless device 502 establishes a wireless connection with the Central Server C 508 and transmits the image in a standard format. The Server C 508 then performs the processing on the image and converts it into a format of standard recognized characters which the wireless device 502 understands. The server 508 thus takes an image format of the inputted information and converts it into another format of known characters. After this processing is complete the server C 508 can then transmit the converted format back to the wireless device 502. The server C 508 could also perform language translation on the inputted information. A microphone 506 at the wireless device 502 accepts voice. Voice clips may be transferred to the server 508 and converted to text using voice recognition software at the server 508. Alternatively, language translation may be performed on the voice file for voice based language translation. After the server 508 has performed these processing steps, voice files or text may be sent back to the wireless device 502.

The system 500 can also be used for user authentication such as with finger print, eye print, or password authentication.

Authentication:

Additionally, the key pad 400/stylus 406 interface could be redefined so that a finger print could be taken for image authentication. This image would be used, for example, for user authentication. The software for recognizing a finger print could reside on a network server 508 or on the hand held device 502.

The present invention allows for handwriting recognition and can be used for authentication. The recognition software can be on the network server or on the hand held device. The present invention also allows for the person to speak to a cell phone/hand held device and access remote macros. For example, by stating "open garage". This command could connect to a network server 508 which would then authenticate the voice. Since voice recognition could be burdensome, this operation could be performed on a networked server 508 or on the hand held device 502. Once the voice has been recognized through voice recognition software, the command will be performed.

Figure 6:
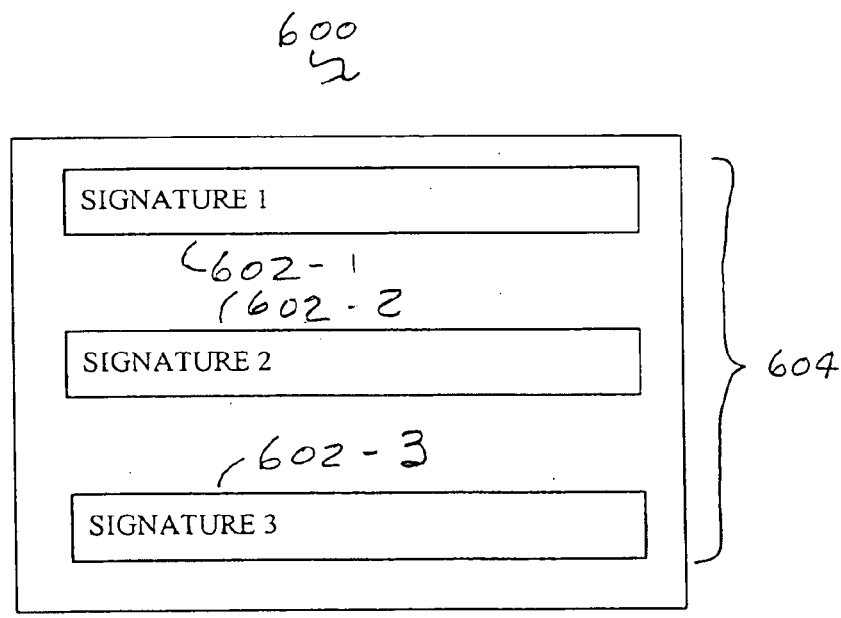
FIG. 6 is an embodiment of the present invention showing how users of the present invention who are physically separated can collaborate in a signing ceremony.

In FIG. 6, an embodiment of an input pad such as a touch sensitive screen 600 of another part of the invention allows for collaborating. The present invention allows screens such as screen 600 to be viewed interactively for interacting from separate devices. For example, if three screens such as screens 602-1, 602-2, 602-3 are used to sign a document from different places, signatures 602 can be on separate screens 600 and optionally displayed on other screens as well. Each screen can be watched separately, with signing being done in parallel or sequentially on the separate screens. This allows the signatures displayed on screens 602 to be placed on a virtual document 604 for interactive verification. Each signature displayed on screens 602 can have a different trust level. The escrow agent is Server C 508.

The present invention has been described with a number of features and advantages. For example, one embodiment of the present invention provides a keyboard device including a a plurality of configurable keys and a central server where the central server includes means for dynamically configuring a legend on a selected key from the configurable keys, means for detecting an actuation (selection) of the selected key with the legend, and means for associating the actuation of the selected key with the legend on the selected key. The central server could be remote or local to the keyboard device.

The keys in the keyboard typically could be LCDs for displaying the respective legends, and desirably are touch sensitive.

The keyboard device could be voice based, sound based or macro based, including key, sound or voice. The keyboard device could be wireless, such as a cellular telephone or mobile device. The keyboard device could be non-wireless.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

What is claimed is:

1. A multifunction communication device, including a mobile device or cellular telephone, the device comprising
    an intelligent keyboard system, the keyboard including central portable compute, command and control means for voice and data information;
    the intelligent keyboard including a touch screen display selected functional text and graphics;
    a central server;
    means for communicating between the server and the mobile device including the intelligent keyboard system;
    the mobile device including the intelligent keyboard system providing text, graphics and data from and to the server;
    the intelligent keyboard system including a touch screen input;
    means for configuring the touch screen input in a stand alone manner;
    means for displaying the selected functionality on the touch screen display;
    means for actuating the input and output functionality on the touch screen display by touch sensitive means,
    means for storing one or more types of full or partial function touch screen enabled keyboard menus in a look up table within the mobile device including the intelligent keyboard and/or the central server; and
    means for enabling the functionality of the keyboard menus.

2. The intelligent keyboard system of claim 1 comprising
    means for communicating between the intelligent keyboard and the servers by wired or wireless means,
    means for configuring the touch screen input using the processing power of the servers.

3. An intelligent keyboard system of claim 1 further comprising
    a multi channel multiplexing transmitter/receiver,
    the multi channel multiplexing transmitter/receiver enabled with one or more input and output channels for wired or wireless communication of voice, text, graphics and data.

4. An intelligent keyboard system of claim 1 comprising
    means for communicating on multiple input and output channels voice, text, graphics and data.

5. An intelligent keyboard system of claim 1 further comprising
    means for maintaining, modifying, personalizing, customizing look up tables and databases within the intelligent keyboard or the central server;
    means for maintaining one or more menus related to standard keyboard, individual key and/or groups of keys within the intelligent keyboard or the central server
    means for dynamically configuring the entire standard keyboard, an individual key and or groups of keys for one or more desired functions.

6. The intelligent keyboard system of claim 1 comprising the functions of
    a cellular telephone;
    a PDA;
    a mobile computer;
    an intelligent appliance.

7. An intelligent keyboard system of claim 1 further comprising means for selecting by audible means, one or more touch screen enabled keyboard menus in one or more languages;

means wherein the audible method is inclusive of voice and sounds;

means wherein the voice and sounds represent one or more discrete or macro functions;

means wherein the audible discrete or macro functions are enabled in one or more selected languages;

means wherein the audible discrete and macro functions are resident in one or more look up tables within the intelligent keyboard or within the local or network server;

means for selecting the discrete and macro functions by audible or touch screen method;

means for enabling the functionality of the discrete and macro functions by audible methods and or;

means for enabling the functionality of the discrete and macro functions by touch screen method;

means wherein standard keystroke and touch screen input are enabled singly or in combination by sound and voice;

means for operating the intelligent keyboard in a stand alone manner and or in conjunction with a local or network server.

8. A intelligent keyboard system of claim 1 comprising a plurality of communicating devices including intelligent keyboards a central, local or network server;

means for wired or wireless communication;

means for the individual communication device including the intelligent keyboard to select one or more touch screen or audible keyboard input methods in one or more languages;

means for enabling real time translation between one or more disparate touch screen enabled keyboard input systems;

means for executing said translations within the communication device including intelligent keyboard itself or in conjunction with the local or network server;

means for real time communication between different communication devices including intelligent keyboards and like function devices in the same or different language;

means wherein one or more touch screen enabled keyboard menus are stored, downloaded, uploaded, modified, updated and shared by one or more communication devices including intelligent keyboard systems and like function devices acting collaboratively with each other and/or means for collaboration between communication devices including intelligent keyboard systems in conjunction with a local or network server.

9. An intelligent keyboard system of claim 1 that further comprising means for assigning a unique identifying number to one or more intelligent keyboards and or like function devices;

means for assigning another unique identifying number to one or more local or network servers;

means for secure and intended communication by wired or wireless means with one or more intelligent keyboards and/or local or network servers;

means for initiating, maintaining and terminating communication between selected servers and intelligent appliances and devices;

means for tracking said communication;

means for enabling collaboration in one or more languages, using same or different types of keyboard input methods;

means for collaborating being text based, voice based or sound based;

means for collaborating being enabled utilizing same or different touch screen enabled keyboard menus;

means for enabling collaboration by having the intelligent keyboards, local servers and network servers being in wired or wireless communication;

means for viewing, sharing, annotating, modifying and editing the same document and file in same or different language;

means for collaborating being enabled by utilizing the processing power of the intelligent keyboard itself or the local or network server.

10. The intelligent keyboard system of claim 1 further comprising means for positioning the selected touch screen enabled keyboard menu in one or more locations on the touch screen display as desired by the user; and/or means wherein the touch screen enabled keyboard menu is moved from one location to another within the touch screen display window;

means wherein one or more touch screen enabled keyboard menus are open contemporaneously in the same or different display window;

means for sizing one or more keyboard menus as desired by the user in one or more display windows.

11. The intelligent keyboard system of claim 1, comprising means for maintaining customized and personalized touch screen enabled keyboard menus;

means for selecting a desired touch screen sensitive menu or keyboard menu;

means for associating voice and sounds for each character that comprises the selected keyboard menu;

means for associating voice and sounds for one or more groups of characters that comprises the selected keyboard menu;

means for maintaining the appropriate look up tables that determine the relationship between the individual or groups of characters and the voice and sounds;

means for maintaining said look up tables within the intelligent keyboard or the local or network server;

means for processing the look up tables and related translations in a standalone manner within the intelligent keyboards or in conjunction with a local or network server;

means for activating by touch sensitive method a character and or groups of characters;

means for associating the selected character and or group of characters to the desired voice and or sound from the look up table;

means for generating the desired display, voice and/or sound.

12. The intelligent keyboard system of claim 1 further comprising means for generating text as each character or group of characters is activated by touch means;

the text being in the desired language for display and further utility;

means for generating real time voice or sound as each character and or group of characters is depressed;

means for enabling such voice and sounds to be transformed into recognizable speech or preset sounds in one or more languages.

13. An intelligent keyboard system comprising a central server, a mobile device configured with an intelligent keyboard including a standard full function keyboard or a partial function light enabled keyboard with no characters pre-printed on all or some of the keys;

means for wired or wireless communication between a mobile device and a central server, means for dynamically selecting a desired individual key or group of keys for a different key function inclusive of different characters, icons and functions, means for dynamically altering and configuring a selected individual key or a group of keys for a different and altered character, icon and function, means for dynamically indicating by light the original or altered key functions on the individual light enabled keys and groups of keys;

means for an altered key and a groups of keys to light up with one or more colors, characters and icons to indicate an altered keyboard menu;

means for configuring an intelligent keyboard including a light enabled keyboard for use in one or more languages;

means for storing one or more key functions and keyboard menus related to an individual key, group of keys or the entire keyboard within a mobile device, a central server including a combination of the mobile device and a central server, means for utilizing the original key functions or altered key functions and keyboard menus using the processing power resident within the mobile device, using the processing power of a central server including a combination of the processing power of the mobile device and a central server, means for executing desired keyboard actions using a desired keyboard menu at a desired time.

14. An intelligent keyboard system of claim 13 comprising a mobile device configured with an intelligent keyboard that includes, a full function standard keyboard with keys that are key stroke sensitive;

means of the full function standard stroke sensitive keys surrounded by touch screen sensitive keys means of stroke sensitive keys configured within a field of the touch screen display;

means of utilizing the standard stroke sensitive keyboard functionality and/or touch screen sensitive input functionality;

means for configuring the touch screen sensitive keys to be on or off as desired by the user;

means for displaying the desired individual key functionality on the touch screen display;

means for selecting the desired menus for dynamically configuring the keyboard;

means for selecting standard key stroke functionality, touch screen sensitive functionality and/or both means contemporaneously.

15. An intelligent keyboard system of claim 13 comprising a mobile device configured with an intelligent keyboard that includes;

a separate key stroke sensitive keyboard;

a separate touch screen sensitive keyboard area;

one or more display areas;

means for displaying the altered keyboard functionality in a display window;

means for viewing the desired keyboard functionality in a display window;

means for utilizing the standard key stroke sensitive keyboard input method and/or;

means for utilizing the touch screen sensitive pen or stylus based input method;

means for contemporaneous communication in the same or different languages utilizing a stroke sensitive keyboard, a touch screen keyboard and one or more display areas;

means for processing the different menus and data using the computational and communication capabilities of the intelligent keyboard by itself or in conjunction with a central, local and or network server.

16. A mobile device communication system comprising one or more mobile devices including intelligent keyboard systems that are touch screen, voice and audio enabled;

a central server, a local server and a network server;

means for enabling the central server as a secure and trusted escrow server, means for maintaining the control of the central server with an independent and mutually trusted third party;

means for wired or wireless communication;

means for collaborating between the mobile devices including intelligent keyboards and the central server or a local server or a network server;

means for collaborating between and among a plurality of mobile devices including intelligent keyboards.

17. An intelligent keyboard system of claim 16 further comprising means for collaborating in one or more languages in a real time basis between a plurality of mobile devices including intelligent keyboard systems;

means for enabling the mobile devices with intelligent keyboards and like function devices for authentication, trust and permission levels;

means for maintaining the authentication and permission levels by a central server;

means for initiating the collaboration and or escrow procedures for a specific purpose;

means for initiating and conducting the collaboration and/or escrow process for contemporaneous use or for use by one or more parties at a desired time.

18. An intelligent keyboard system of claim 16 further comprising means for viewing, sharing, annotating, modifying, editing the text document, graphics, image, video, audio, sound and data and or combinations thereof as a collaborative product;

means for defining and working with different types of collaborative product that is inclusive of text, voice, sound, audio, image, video, graphics and data;

means for accessing and using the collaborative product in a contemporaneous manner and/or at a later time by one or more users;

means for maintaining revision control by the central server or a designated intelligent keyboard user;

means for time stamping the access and actions of one or more parties to the collaborative work product in progress;

means for maintaining electronically valid signatures images and authentication files for each user that is party to the said transaction;

means for providing a signature window on a touch screen of the intelligent keyboard or like function device;

means for providing one or more windows for the signature of witnesses if needed in the intelligent keyboard or like function device;

means for acquiring and maintaining relevant data about the keyboard users and witnesses.

19. An intelligent keyboard system of claim 16 that further comprising means for negotiating the final version of the collaboration product;

means for reaching agreement on the final version of the collaborative product by the relevant parties to the collaboration;

means for indicating agreement by both parties of their willingness to approve and sign off on the particular collaborative product;

means for approving and signing of the collaborative work product in the touch screen signature windows of catch of the mobile devices including the intelligent keyboard, by all parties simultaneously or at designated times by one or more parties;

means for executing said signatures on a touch sensitive screen by pen based, stylus bases or other methods;

means for comparing said signatures to signature images, signature strokes and hand written signatures on file;

means for authenticating the signatures by hand writing recognition software and other means;

means for notifying all parties to the transaction that the collaborative process has been concluded;

means for executing the entire collaborative process by leveraging the wired or wireless communication means and computing capabilities of each of the intelligent keyboards enabled mobile devices and or the central server.

20. An intelligent keyboard system of claim 16 further comprising means for wired or wireless communication and collaboration between stationary devices, mobile devices, intelligent appliances and one or more local, network servers, and or escrow servers;

means for direct collaboration for gaming, entertainment, and educational applications between one or more mobile and stationary device users; including means for collaborating for gaming, entertainment and educational and other applications between one or more users in conjunction with a local or network server.

21. An intelligent keyboard system of claim 16 further comprising means for acquiring a finger print of one or more users by ink and paper, digitizing or other means for baseline line data archiving;

means for digitizing the finger print data means for maintaining the finger print data in a database and relevant look up tables;

means for acquiring the selected user's finger print in a touch screen window by imaging and or digitizing methods;

means for digitizing the finger print acquired by said touch sensitive and or imaging means;

means for time stamping the finger print acquisition process;

means for authenticating the real time finger print process by a witness or trusted escrow agent;

means for comparing the acquired finger print data with the original finger print data in the database maintained by a escrow server;

means for utilizing the wired or wireless communication and computing capabilities of the intelligent keyboard and or the central server or escrow server for authentication and other functions.

22. The intelligent keyboard system of claim 16 further comprising means for authentication by voice recognition means, including means for contemporaneous authentication by signature means in a touch screen window, by finger print means in a touch screen window and by voice recognition means;

means wherein the voice liles associated with the specific user are maintained by the central server or escrow server for authentication purposes, means for authentication by one or more of said selected authentication methods.

23. The intelligent keyboard system of claim 16 further comprising means for contemporaneous authentication by signature means in a touch screen window, means for authentication by finger print methods in a touch screen window, means for authentication by voice recognition methods;

means for maintaining the photographic images of users and objects in a database and look up tables resident on the intelligent keyboard and or the central server;

means for real time photographic image acquisitions;

means for comparing and authenticating real time photographic images in conjunction with the databases resident on the intelligent keyboard and or the trusted central escrow server;

means for authentication by one or more of said selected authentication methods.

24. The intelligent keyboard system of claim 16 further comprising means for acquiring a retinal scan of a user;

means wherein the retinal scan images files associated with the specific user are maintained in a database and look up tables by the central server for authentication purposes; including means for associating voice, finger print, photo and retinal scan data of a user;

means for transmitting and receiving by wired or wireless means by the intelligent keyboard of the data;

means for communicating between the intelligent keyboard and the central server;

means for authenticating of the relevant data in conjunction with a trusted central server, means for authentication by one or more of said selected authentication methods.

25. The intelligent keyboard system of claim 16 further comprising means for unique mobile device identification by one or more methods inclusive of mobile IP, static IP and dynamic IP address and or other system identification means;

means for time determination via a time determining server, means for location determination via a global positioning system and server;

means for providing different levels of security, authentication and control via a local, central and or network server;

means for wired and wireless communication between one or more intelligent keyboards and servers;

means for authenticating the identity including the time and location of a mobile device in conjunction with a trusted central and or escrow server.

26. An intelligent keyboard system comprising one or more intelligent keyboard devices;

one or more mobile devices, one or more intelligent appliances;

a central, local or network server;

means for unique identification and addressing of the intelligent devices;

means for configuring an intelligent keyboard as a wired or wireless remote controller;

means for real time selection and installation on the controller, one or more discrete and specific action control icons resident on a database within the intelligent keyboard and or a local or network server;

means for displaying the discrete and macro function action icons on a touch screen input and display;

means for actuating the icons by touch screen input methods that include pen based, stylus based and other touch sensitive methods;

means for maintaining one or more customized icons, macros and touch screen enabled utilities on the intelligent keyboard, a central server or the intelligent appliance;

means for installing said standard or customized icons, macros and utilities on the intelligent appliance and the intelligent keyboard and like function devices;

means for controlling the intelligent appliance via the intelligent keyboard acting in a standalone manner or in conjunction with a central server, a local server or a network server;

means for enhanced processing and communication between the servers, the intelligent appliances and the intelligent keyboard device to execute specific command, control and computational related tasks.

* * * * *